United States Patent [19]

Kim

[11] 4,016,409
[45] Apr. 5, 1977

[54] LONGITUDINAL PARITY GENERATOR FOR USE WITH A MEMORY

[75] Inventor: Dongsung Robert Kim, Fountain Valley, Calif.

[73] Assignee: Burroughs Corporation, Detroit, Mich.

[22] Filed: Mar. 1, 1976

[21] Appl. No.: 662,573

[52] U.S. Cl. .............. 235/153 AM; 340/146.1 AG
[51] Int. Cl.² .................. G06F 11/10; G11C 29/00
[58] Field of Search .......................... 235/153 AM; 340/146.1 AG, 174 ED

[56] References Cited
UNITED STATES PATENTS

| | | | |
|---|---|---|---|
| 3,805,040 | 4/1974 | Boden et al. | 235/153 AM |
| 3,876,978 | 4/1975 | Bossen et al. | 340/146.1 AG |
| 3,887,901 | 6/1975 | Moore | 340/146.1 AG |

Primary Examiner—Charles E. Atkinson
Attorney, Agent, or Firm—Nathan Cass; Kevin R. Peterson; Edward J. Feeney, Jr.

[57] ABSTRACT

Longitudinal parity is continuously provided for a predetermined plurality of words stored in a digital memory in a simple and expeditious manner without interfering with normal memory operation. The outputs of the memory read and write registers are applied in corresponding bit pairs to respective ones of a plurality of Exclusive ORs whose outputs are employed to update the respective flip flops of a longitudinal parity register at a time which is specially chosen so that the old word read out of the memory and the new word to be written therein are simultaneously available in the read and write registers.

5 Claims, 3 Drawing Figures

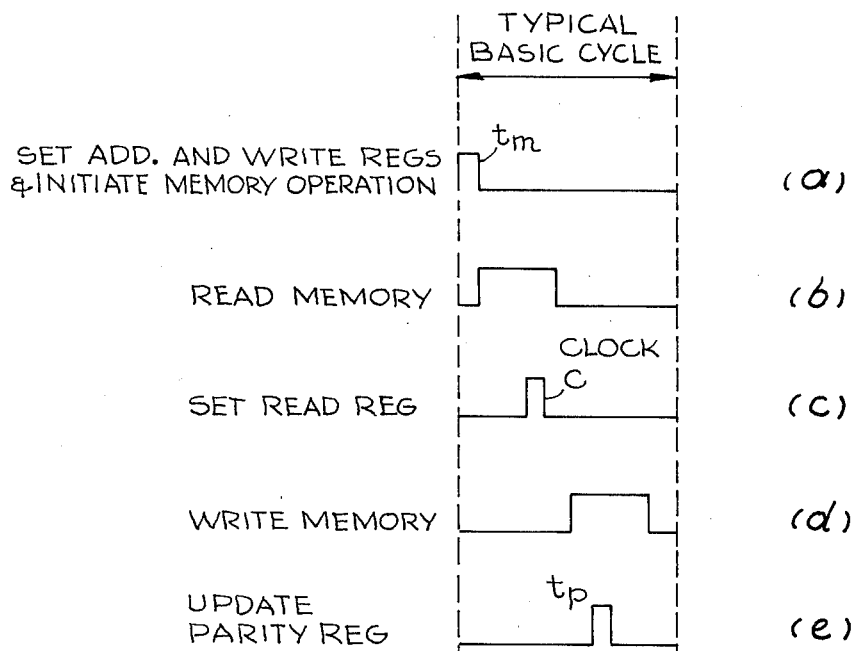

LONGITUDINAL PARITY GENERATOR FOR USE WITH A MEMORY

BACKGROUND OF THE INVENTION

The present invention relates to improved means and methods for generating a longitudinal parity word for a predetermined plurality of words stored in a digital computer memory.

It is well known in the art to provide for checking and/or correcting of digital data by the provision of one or more "parity" bits along with a group of data bits. Typically, each word of a data group comprising a predetermined plurality of horizontally arranged words may be provided with a horizontal parity bit, and each column of the data group may be provided with a longitudinal parity bit. As is well known, by appropriately combining these parity and longitudinal parity bits, error detection may be achieved and also, in appropriate cases, error correction may additionally be provided. For example, if it is assumed that there is only a single bit error in the bits of a data group, then the horizontal parity bit will identify the particular word containing the error bit, while the longitudinal parity bit will identify the particular column of the word containing the error bit. Accordingly, such a single error bit in a data group is not only uniquely identified, but also may be appropriately corrected by correction circuitry well known to those in the art.

Although the provision of horizontal and longitudinal parity bits in a data group is generally desirable, the cost of the additionally required hardware and/or software must be balanced against the advantages to be gained. In particular, it has often been found to be uneconomical to provide for the continuous generation of longitudinal parity for a plurality of words stored in a digital memory. Attempts to solve this problem for a digital computer memory have been proposed, such as disclosed for example in U.S. Pat. No. 3,887,901, but even the reduced hardware proposed by this patent is not sufficiently economical for many applications.

SUMMARY OF THE INVENTION

In accordance with a preferred embodiment of the present invention, longitudinal parity is continuously provided for a predetermined plurality of words stored in a digital memory in a remarkably simple and inexpensive manner using an approach which does not in any way detract from the normal operation of the memory, and which requires a minimum of additional circuitry. This is accomplished in the preferred embodiment by specially selecting the particular time at which the longitudinal parity bits are to be generated such that both the word being read out from the memory and the new work being written into the memory are simultaneously available, and then taking advantage of this simultaneous availability to provide for generation therefrom of the desired longitudinal parity word using a single set of Exclusive OR gates respectively to complement the flip flops of a longitudinal parity register.

The specific nature of the invention as well as other objects, advantages, features and uses thereof will become evident from the following more detailed description of the invention taken in conjunction with the accompanying drawings.

BRIEF DESCRIPTION OF THE DRAWINGS

FIG. 2 illustrates pertinent timing waveforms and pulses occurring during a typical basic cycle of a computer in which the invention may be incorporated.

FIG. 3 illustrates examples of typical operation of the preferred embodiment of FIG. 1.

DESCRIPTION OF THE PREFERRED EMBODIMENT

Figure 1:
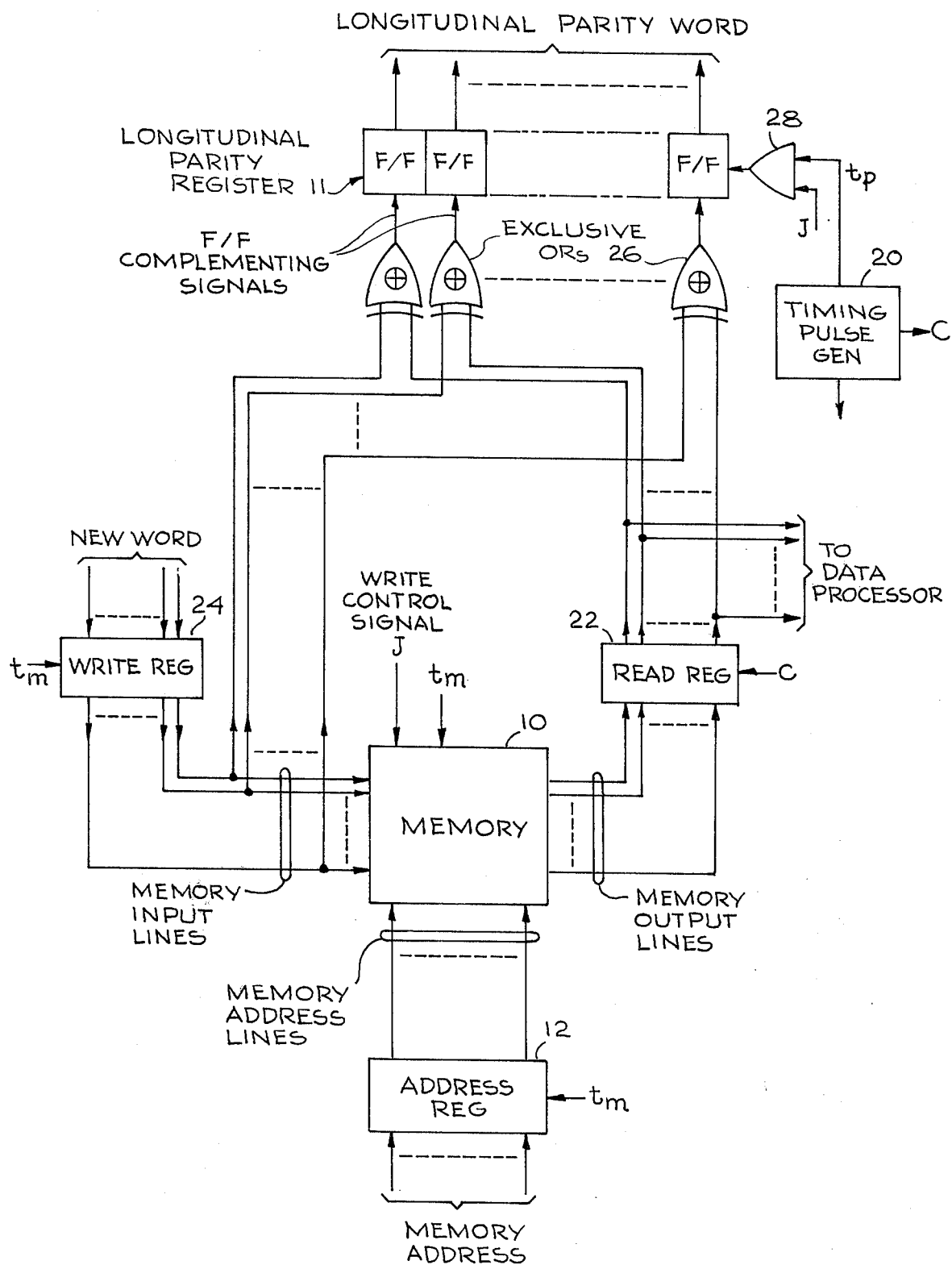
FIG. 1 is an electrical block and circuit diagram illustrating the continuous generation of a longitudinal parity word for a predetermined plurality of words stored in a digital computer memory.

Initially, it is to be understood that a primary purpose of the preferred embodiment of the invention illustrated in FIG. 1 is to provide for the generation of a longitudinal parity word in a longitudinal parity register 11 for a predetermined plurality of words stored in a digital memory 10 in a manner such that the longitudinal parity register is continuously and economically updated concurrently with my change of a word stored in the memory 10 without interfering with normal memory operation. For illustrative purposes, it will be assumed that the longitudinal parity bits of the longitudinal parity word are chosen to provide even parity. Accordingly, when each longitudinal parity bit is added to its corresponding bits stored in the same column in the memory 10, the resultant total will be even.

Referring to FIG. 1, it will be understood that, in a conventional manner, the memory 10 cooperates with an address register 12 which provides an address to the memory 10 via memory address lines for selecting a particular word address in the memory 10 for reading thereof and/or writing therein. The memory 10 may be constructed in any of a number of well known forms using, for example, cores, semiconductors or other types of bistable elements.

A typical basic cycle of a data processing system in which the memory 10 may be incorporated is illustrated in FIG. 2. As illustrated in FIG. 2(a), a memory initiate pulse $t_m$ provided by a timing pulse generator 20 sets the address register 12 to a selected memory word address and activates the memory 10 to perform a read and write operation during the cycle. More specifically, during the first portion of the cycle, the memory 10 reads out the word at the address selected by the address register 12, the word thus read out of the memory 10 being set up in a read register 22 in response to the occurrence of a clock C (FIG. 2(c)) also provided by the timing pulse generator 20. Following the occurrence of the clock C (FIG. 2(c)), the word address selected by address register 12 may have a new word written therein from a write register 24 (FIG. 2(d)), dependent upon a write control signal J which indicates whether a write operation is to be performed during each cycle.

It will be appreciated from the foregoing that, during the write portion of the cycle (FIG. 2(e)), the read register 22 will continue to retain the selected word read out from the memory 10 during the first portion of the cycle and set up therein in response to the clock C (FIG. 2(c)). Consequently, advantage may be taken of the simultaneous availability during the write portion of the cycle (FIG. 2(e)) of the new word to be written contained in the write register 24 and of the old work retained in the read register 22 to continuously and concurrently update the longitudinal parity word contained in the longitudinal parity register 11 without any interference with normal memory operation, and also without the need of special selection and switching circuitry as was required, for example, in the approach of the aforementioned U.S. Pat. No. 3,887,901. Accordingly, as illustrated in FIG. 2(e), the timing pulse generator 20 is caused to generate a parity updating pulse $t_p$ during the write portion of each cycle in order to take advantage of this simultaneous availability to update the longitudinal parity word in the longitudinal parity register 11. The pulse $t_p$ is applied to the longitudinal parity register 11 via an AND gate 28 having the write control signal J as its other input so as to inhibit parity updating when no writing operation is to be performed during a cycle.

As illustrated in FIG. 1, the longitudinal parity register 11 comprises a plurality of flip flops, one for each longitudinal parity bit. The outputs of the read register 22 and the wirte register 24 are applied in respective bit pairs to respective ones of a plurality of Exclusive ORs 20 whose outputs are in turn applied to a respective flip flop of the longitudinal parity register 11 for complementing the state thereof whenever a particular pair of bits of the new and old words are different. As a result, the longitudinal parity register 11 will be updated to correctly represennt the longitudinal parity word which will be applicable each time a new word is written into the memory 10 during the write portion of the cycle. It will be understood that the Exclusive ORs 26, as well as the complementing flip flops of the longitudinal parity register 11 which complement their state in response to respective one of the outputs of the Exclusive ORs 26, are readily available in the art and accordingly will not be described in detail herein.

The construction and operation of the embodiment of the invention illustrated in FIG. 1 will become even more clearly apparent from the following series of examples illustrated in FIG. 3 which demonstrate how the invention may typically be operated. For the purpose of these examples, it will be assumed that the memory word size is 6-bits and that the memory capacity is 4 words which may be stored at word addresses 1, 2, 3 and 4 of the memory 10. It will be understood, however, that the same principles of the present invention may be applied to larger capacity memories as well as to only a particular plurality of words stored in a memory at selected addresses. It will further be assumed that the memory 10 initially contains no stored information, in which case, all elements are to their "0" state as illustrated in FIG. 3(a). Accordingly, the longitudinal parity word in the longitudinal parity register 11 will likewise have all 0's in accordance with the even parity convention being assumed for these examples. It will be appreciated that the right most digit of each stored word may be a horizontal parity bit providing for even parity, in which case, it is also "0" as shown.

With reference now to FIG. 3(b) along with FIG. 1, it will be assumed that a new word 101011 is to be written into word address 1 of the memory 10 during the current cycle. The address register 12 is thus set to word address 1 by the pulse $t_m$ (FIG. 2(a)) and the write register 24 is set by $t_m$ to the new word 101011. Accordingly, during the read memory portion of the current cycle (FIG. 2(b)), all 0's will be read out of word address 1 of the memory 10 and set up in the read register 22 when the clock C occurs (FIG. 2(c)). Thus, during the write portion of the cycle (FIG. 2(d)), the write register 25 will contain the new word 101011 to be stared at word address 1, while the read register 22 will contain the old word 000000. As shown in FIG. 1, corresponding pairs of these simultaneously available new and old words in the write and read registers 24 and 22, respectively, are logically combined by respective ones of the Exclusive ORs 26, each of which operates in a well known manner to provide a "1" output whenever the pair of bits applied thereto is different. Since a new word is to be written into the memory 10 during the current cycle, write control signal J is caused to be true to enable AND gate 28 to permit the parity updating pulse $t_p$ (FIG. 2(e)) to be applied to each of the longitudinal parity word flip flops, whereby each longitudinal parity flip flop receiving a "1" output from its respective Exclusive OR 26 is complemented. Thus, at the end of the current cycle, the new word 101011 will have been stored in word address 1 of the memory 10, and the previous longitudinal parity word 000000 in the longitudinal parity register 11 will have been updated to 101011 to provide correct even parity for the four words stored in the memory, as shown in FIG. 3(b). More specifically, it will be evident that, starting from the left most end, the first, third, fifth and sixth bit positions of the newly stored word 101011 are different from those of the old word 000000. The particular longitudinal parity flip flops corresponding to these bit positions are thus complemented by the "1" outputs of their respective Exclusive ORs to update the parity word from 000000 (FIG. 3(a)) to 101011 (FIG. 3(b)).

It will next be assumed with reference to FIG. 3(c) that, in the next cycle, a new word 111111 is loaded into the write register 24 in response to the pulse $t_m$, while the address register 12 is set to word address 3. Thus, during this cycle, the old word 000000 in word address 3 is read out from the memory 10 during the read portion of the cycle (FIG. 2(b)) and set up in the read register 22 at the occurrence of the clock C (FIG. 2(c)). During the write portion of the cycle (FIG. 2(d)), the new word 111111 is stored in word address 3 of the memory 10, while the parity updating pulse $t_p$ (FIG. 2(e)) causes the flip flops of the longitudinal parity register 11 to be updated in response to the results of the respective Exclusive OR comparisons of each corresponding pair of bits of the new and old words simultaneously available in the read and write registers 22 and 24. The resulting storage condition of the memory 10 after the cycle is thus as illustrated in FIG. 3(c). It will also be noted from FIG. 3(c) that the longitudinal parity word has been updated from 101011 (FIG. 3(b)) to 010100 as a result of the complementing of all of the longitudinal parity flip flops in response to the "1" outputs produced by the Exclusive ORs 26 for all bit positions, since each corresponding pair of bits of the old word 000000 and the new word 111111 are different for every bit position. Consequently, the longitudinal parity word 010100 illustrated in FIG. 3(c) is necessarily the complement of the longitudinal parity word 101011 illustrated in FIG. 3(b) for the previous cycle.

FIG. 3(d) illustrates a final example in which it is now assumed that the write register 24 is loaded with a new word 111001, while the address register 12 is again set to address 1. As will now be readily apparent from the foregoing description in connection with FIGS. 3(a), (b), and (c), the old word 101011 is read out from the memory 10 during the read portion of the cycle (FIG. 2(b)) and set up in the read register 22 in response to the clock C (FIG. 2(c)). The new word 111001 is then written into word address 1 during the write portion of the cycle (FIG. 2(d)), while the longitudinal parity word in the longitudinal parity generator is updated from 010100 (FIG. 3(c)) to 000110 in response to the parity updating pulse $t_p$. The resulting storage condition of the memory is thus as illustrated in FIG. 3(d) which shows the new word 111001 stored in word address 1 and the longitudinal parity word having the value 000110.

Although the description of the invention provided herein has been directed to a particular illustrative embodiment, it is to be understood that many modifications and variations in structure, arrangement, operation, and use are possible within the comtemplated scope of the invention without departing from the spirit of the invention. The appended claims should accordingly be construed to cover and embrace all such possible modifications and variations within the true spirit and scope of the invention.

What is claimed is:

1. In combination:

a digital memory for storing a plurality of words at selectably addressable locations thereof;

addressing means for addressing a selected word address in said memory;

said memory being responsive to said addressing means for performing a read operation during which a word is read out from said selected word address followed by a write operation during which a word applied to said memory is stored in said selected word address;

pulse generating means for generating a clock signal occurring following each read out of a word from said memory and prior to completion of said write operation;

a read register to which a word read out from said memory is applied, said read register being set up in accordance with the word read out from said memory in response to said clock signal;

a write register for applying a word to said memory during said write operation;

a longitudinal parity register for storing a longitudinal parity word corresponding to a predetermined plurality of words stored in said memory; and longitudinal parity updating means responsive to the existing outputs of said read and write registers for applying updating signals to said longitudinal parity register;

said pulse generating means providing an updating signal during each write operation occurring subsequently to each clock signal for causing said updating signals to be applied to said longitudinal parity register for updating the longitudinal parity word stored therein in accordance with the then existing outputs of said read and write registers.

2. The invention in accordance with claim 1, wherein said longitudinal parity generating means comprises a plurality of Exclusive ORs, wherein corresponding bit pairs of the words stored in said read and write registers are applied to respective ones of said Exclusive ORs, and wherein said longitudinal parity register comprises a plurality of flip flops responsive to respective ones of said Exclusive ORs.

3. The invention in accordance with claim 2, wherein the state of each of said flip flops is complemented in response to its respective Exclusive OR providing an output indicating a difference in the respective bit pair applied thereto.

4. The invention is accordance with claim 3, wherein said addressing means in an address register which is set prior to a read operation and subsequent to a write operation.

5. The invention in accordance with claim 3, wherein said write register is set at the same time as said address register.

* * * * *